United States Patent Office 3,231,470
Patented Jan. 25, 1966

3,231,470
THERAPEUTIC COMPOSITIONS CONTAINING 7 - CHLORO - 2 - METHYLAMINO - 5 - PHENYL-3H - 1,4 - BENZODIAZEPINE - 4 - OXIDE AND ESTROGENIC SUBSTANCES
Gerhard Zbinden, Essex Fells, N.J., assignor to Hoffmann-La Roche Inc., Nutley, N.J., a corporation of New Jersey
No Drawing. Filed Jan. 28, 1963, Ser. No. 254,444
3 Claims. (Cl. 167—65)

The present invention relates to therapeutic compositions. More particularly, it relates to therapeutic compositions containing 7-chloro-2-methylamino - 5 - phenyl-3H-1,4-benzodiazepine-4 - oxide and an estrogenic substance.

The present compositions are useful in the treatment of the unpleasant symptoms associated with menopause, e.g., flushing, hot flashes, depressed feeling, anxiety states, etc. It has unexpectedly been found that by administering the present composition to menopausal women, the typical symptoms of menopause, such as fatigue, nervousness, depression, irritability, and others, can be alleviated with a lower dosage of estrogenic substance than if an estrogenic substance is given alone. Therefore, the possibility of withdrawal bleeding and other side effects associated with estrogen therapy is substantially reduced.

The method of treating a woman having an unpleasant symptom of menopause comprises treating a woman so-afflicted with a composition containing 7-chloro-2-methyl-amino-5-phenyl-3H-1,4-benzodiazepine-4-oxide, or an acid addition salt thereof with a pharmaceutically acceptable acid, and an estrogenic substance.

The acid addition salts with pharmaceutically acceptable acids of 7-chloro-2-methylamino-5-phenyl-3H - 1,4-benzodiazepine-4-oxide that can be employed include the mineral acid salts, e.g., the hydrochloride, hydrobromide, hydroiodide, sulfate, nitrate, phosphate, etc., and organic acid salts such as the arylsulfonates, e.g., benzene and toluene sulfonates, the citrate, tartrate, acetate, lactate, etc.; the hydrochloride salt or the free base being preferred. Hereinafter when the term "7-chloro-2-methyl-amino-5-phenyl-3H-1,4-benzodiazepine-4-oxide" is used, it will be understood to refer to either the free base or an acid addition salt thereof with a pharmaceutically acceptable acid.

The estrogenic substances that can be employed in the compositions of the invention include "conjugated estrogenic substances" and ethinyl estradiol.

The term "conjugated estrogenic substances" is understood by the art to be an amorphous preparation containing the naturally occurring water-soluble conjugated forms of the mixed estrogens obtained from the urine of pregnant mares. See "New and Nonofficial Drugs," 1960. The principal estrogen present in conjugated estrogenic substances is sodium estrone sulfate, and the total estrogenic potency of the preparation is expressed in terms of an equivalent quantity of sodium estrone sulfate. The term "conjugated estrogenic substances" as used herein includes also mixtures of naturally occurring mixed estrogens and sodium estrone sulfate and also includes sodium estrone sulfate itself.

The compositions of the invention are prepared by mixing together the 7-chloro-2-methylamino-5-phenyl-3H-1,4-benzodiazepine-4-oxide and the estrogenic substance, and optionally, pharmaceutical adjuvants, and forming the resulting mixtures into suitable dosage forms. Compositions suitable for oral administration are the known pharmaceutical forms for such administration, e.g., pressed or coated tablets, capsules, syrups and oily suspensions, and the pharmaceutical adjuvants used in the production of these formulations are those well known to the pharmacists' art, as are also the means of formulation. Suitable oral compositions include capsules and tablets wherein the active ingredients are mixed with inert fillers, e.g., dicalcium phosphate or lactose in the presence of disintegrating agents, for example, maize starch, and lubricating agents, for example, calcium stearate or talc. Oily suspensions for oral use may be formulated in a suitable vegetable oil, for example, arachis oil, which may contain suitable sweetening agents and preservatives.

The active ingredients of the invention can also be used in rectal suppository form by mixing them with suppository adjuvant material, e.g., fatty acid esters of glycerine, or glycols, e.g., cocoa butter, propylene glycol monostearate, etc., by techniques well known to the art.

The ratio of active ingredients can vary over a wide range, for example, from about 2 to about 125, preferably from about 12.5 to about 50 parts by weight of 7-chloro-2-methylamino-5-phenyl-3H-1,4-benzodiazepine - 4 - oxide per part by weight of conjugated estrogenic substances (measured in terms of the equivalent weight of sodium estrone sulfate). A typical adult dosage ranges from about 5 to about 25, preferably about 5 to about 10 mg. of 7-chloro-2-methylamino-5-phenyl-3H-1,4 - benzodiazepine-4-oxide with from about 0.2 to about 2.5 mg., preferably about 0.2 to about 0.4 mg. of conjugated estrogenic substances (measured as sodium estrone sulfate). The above dosage is administered to a patient three or four times daily. Smaller dosages are of course employed for debilitated patients. However, the above ranges are not critical, and dosages outside these ranges may, in some instances, be advantageously employed.

Alternatively, in place of the conjugated estrogenic substances, ethinyl estradiol can be employed in amounts ranging from about 0.01 mg. to about 0.1 mg.; i.e., from about 50 to about 2500 parts by weight of 7-chloro-2-methylamino-5-phenyl-3H-1,4-benzodiazepine-4-oxide can be employed per part by weight of ethinyl estradiol.

The following examples are given to illustrate but not to limit the invention.

*Example 1*

A tablet is prepared from the following ingredients mixed together in a Fitzpatrick comminuting machine:

| | Mg. |
|---|---|
| 7-chloro-2-methylamino-5-phenyl-3H-1,4 - benzodiazepine-4-oxide | 5.1 |
| Conjugated estrogenic substances [1] (expressed as sodium estrone sulfate) | [2] 0.2 |
| Sodium bicarbonate | 0.55 |
| Lactose | 19.20 |
| Cornstarch | 13.90 |
| Calcium stearate | 2.00 |

[1] 1 gram of conjugated estrogenic substances is equivalent to 34.5 mg. of conjugated estrogenic substances expressed as sodium estrone sulfate.
[2] 6 mg. of conjugated estrogenic substances actually employed.

The above ingredients are mixed together and then compacted in a tablet-forming machine and coated with a sugar coating syrup.

*Example 2*

A formulation is prepared according to the process of Example 1 using the same ingredients and quantities in Example 1 except that 10 mg. of 7-chloro-2-methylamino-5-phenyl-3H-1,4-benzodiazepine-4-oxide hydrochloride is employed.

*Example 3*

A composition according to Example 1 is prepared except that 0.01 mg. of ethinyl estradiol is employed in place of the conjugated estrogenic substances.

Example 4

A composition of Example 1 is prepared and the process of Example 1 followed, except that the mixture is filled into a hard shell capsule instead of being passed into a tablet-making machine.

Example 5

10 mg. of 7-chloro-2-methylamino-5-phenyl - 3H - 1,4-benzodiazepine-4-oxide, 0.4 mg. of conjugated estrogenic substances (expressed as sodium estrone sulfate), 3.9 mg. of white beeswax, 95.3 mg. of polyoxyethylene sorbitan mono-oleate (Tween 80) and 117 mg. of propylene glycol monostearate are mixed together, heated, and shaped in the form of a rectal suppository.

Variations of the process and composition of the invention can be undertaken by those skilled in the art without departing from the scope or spirit of the invention.

I claim:

1. A therapeutic composition comprising (a) a compound selected from the group consisting of 7-chloro-2-methylamino-5-phenyl-3H-1,4 - benzodiazepine - 4 - oxide, and an acid addition salt thereof with a pharmaceutically acceptable acid, and (b) conjugated estrogenic substances (NND), wherein from about 12.5 to about 50 parts of said compound are present per part by weight of conjugated estrogenic substances (NND) expressed as sodium estrone sulfate.

2. A therapeutic composition for internal administration in shaped dosage unit form comprising (a) from about 5 to about 10 mg. of a compound selected from the group consisting of 7-chloro-2-methylamino-5-phenyl-3H-1,4-benzodiazepine-4-oxide and an acid addition salt thereof with a pharmaceutically acceptable acid, (b) from about 0.2 to about 0.4 mg. of conjugated estrogenic substances (NND) expressed as sodium estrone sulfate, and (c) pharmaceutical adjuvant material.

3. A composition according to claim 2 wherein 7-chloro-2-methylamino-5-phenyl-3H - 1,4 - benzodiazepine-4-oxide hydrochloride is employed.

References Cited by the Examiner

New and Nonofficial Drugs, 1960, pages 571–3.
Physicians Desk, Reference, 15th edition, 1961, pages 708–9.

FRANK CACCIAPAGLIA, Jr., *Primary Examiner.*

LEWIS GOTTS, *Examiner.*